United States Patent
Taniuchi et al.

(10) Patent No.: US 10,919,214 B2
(45) Date of Patent: Feb. 16, 2021

(54) METHOD AND APPARATUS FOR MANUFACTURING STRUCTURE

(71) Applicant: CANON KABUSHIKI KAISHA, Tokyo (JP)

(72) Inventors: Hiroshi Taniuchi, Yokohama (JP); Kazuhiro Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 445 days.

(21) Appl. No.: 15/682,396

(22) Filed: Aug. 21, 2017

(65) Prior Publication Data

US 2017/0341298 A1    Nov. 30, 2017

Related U.S. Application Data

(62) Division of application No. 14/307,354, filed on Jun. 17, 2014, now Pat. No. 9,770,870.

(30) Foreign Application Priority Data

Jun. 20, 2013    (JP) .............................. JP2013-130037

(51) Int. Cl.
| | |
|---|---|
| *B29C 64/124* | (2017.01) |
| *B29C 64/40* | (2017.01) |
| *B33Y 10/00* | (2015.01) |
| *B33Y 30/00* | (2015.01) |
| *B29C 64/214* | (2017.01) |
| *B29C 64/223* | (2017.01) |

(52) U.S. Cl.
CPC .......... *B29C 64/124* (2017.08); *B29C 64/214* (2017.08); *B29C 64/223* (2017.08); *B29C 64/40* (2017.08); *B33Y 10/00* (2014.12); *B33Y 30/00* (2014.12)

(58) Field of Classification Search
CPC ........ B29C 64/147; B33Y 10/00; B33Y 30/00
See application file for complete search history.

(56) References Cited

U.S. PATENT DOCUMENTS

| | | | | |
|---|---|---|---|---|
| 7,550,518 B2* | 6/2009 | Bredt | ..................... | B29C 41/003 523/160 |
| 9,155,597 B2* | 10/2015 | Brodkin | ................. | A61K 6/884 |
| 2001/0042598 A1* | 11/2001 | Yamada | ................. | B33Y 10/00 156/362 |

(Continued)

FOREIGN PATENT DOCUMENTS

| | | |
|---|---|---|
| JP | H07108609 A | 4/1995 |
| JP | 2003159754 A | 6/2003 |
| JP | 2012040757 A | 3/2012 |

*Primary Examiner* — Jacob T Minskey
*Assistant Examiner* — Melody Tsui
(74) *Attorney, Agent, or Firm* — Canon U.S.A., Inc. IP Division

(57) ABSTRACT

A manufacturing method of a structure includes, in this order: providing a layer constituted by a support member and a modeling layer by bringing a regulating surface of a regulating member into contact with the modeling layer provided on a surface of an intermediate transfer member, pouring a material for the support member which becomes the support member to fill the periphery of the modeling layer while the regulating surface abutting the modeling layer, and solidifying the material for the support member; removing the regulating member from the layer constituted by the support member and the modeling layer.

9 Claims, 5 Drawing Sheets

(56) References Cited

U.S. PATENT DOCUMENTS

2009/0304952 A1* 12/2009 Kritchman ............. B33Y 10/00
427/595
2012/0213976 A1* 8/2012 Xu ......................... C08L 91/06
428/195.1

* cited by examiner

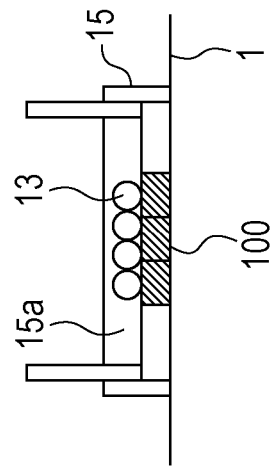
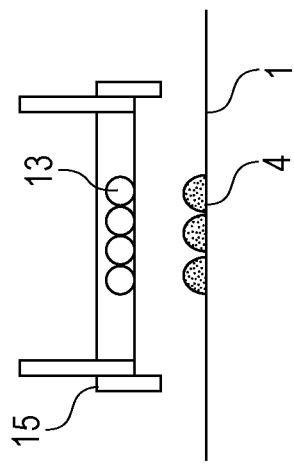
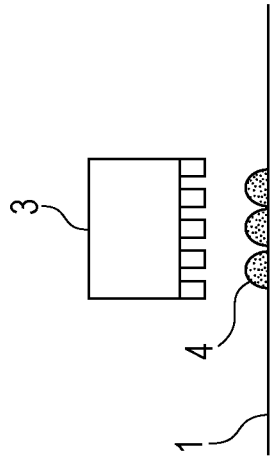
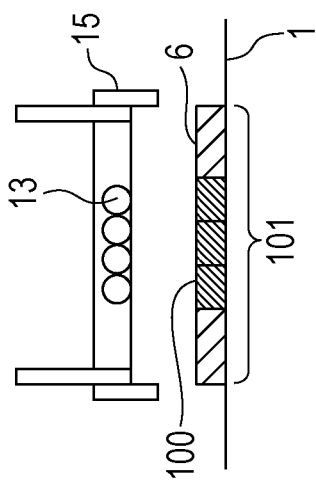
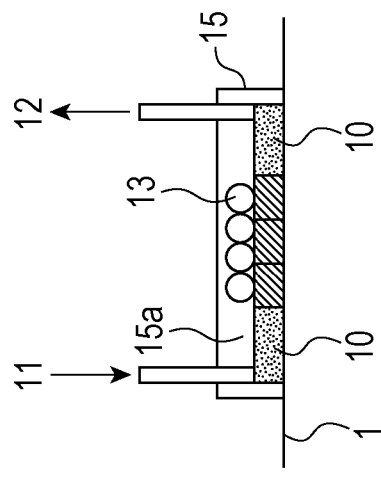

METHOD AND APPARATUS FOR MANUFACTURING STRUCTURE

CROSS-REFERENCE TO RELATED APPLICATIONS

This application is a divisional of U.S. application Ser. No. 14/307,354, filed Jun. 17, 2014, which claims the benefit of Japanese Patent Application No. 2013-130037, filed Jun. 20, 2013, all of which are hereby incorporated by reference herein in their entirety.

BACKGROUND OF THE INVENTION

Field of the Invention

The present invention relates to a method and an apparatus for manufacturing a structure.

Description of the Related Art

A 3D modeling method for creating an arbitrary 3D object by laminating paper or film processed into a cross-sectional pattern of the 3D object has been proposed. This method is called a sheet laminating method, in which a 3D object is obtained by cutting previously prepared sheets using cutter or laser, and laminating the sheets. Therefore, the foregoing method is advantageous in thickness accuracy of layers and an apparatus to implement the method may be assembled with a relatively simple configuration as compared with other laminating 3D modeling methods.

As an exemplary method for modeling such a 3D object, a lamination modeling method in which a material which is to be modeled as a 3D object is laminated and creates a final structure has been proposed.

A restriction characteristic to the lamination modeling method is the need of a support. In the lamination modeling method, layered-shaped patterns are laminated. Therefore, for example, a modeled product in which an isolated portion (i.e., an overhung portion), such as a drooping branch of tree, is created during the manufacturing process is difficult to manufacture. In order to create such a portion by lamination molding, it is necessary to build a "support" at a lower portion which may become the isolated portion. The support is unnecessary in the final product state and should be removed the support by a certain means after the end of the modeling.

Also in the sheet laminating method, a support is necessary in modeling an overhung portion. Basically, the support is formed in the following manner: the sheets are laminated without removing cut margins and, removing the margins after the modeling is completed to create the support.

However, since the sheet is a single solid material, if the target object has a complicated shape, it is difficult to remove margins after modeling is completed. Therefore, it has been extremely difficult to create a highly accurate modeled product by the sheet laminating method.

In contrast, there is a method to form a support by different material from that of the modeling material in order to reduce removal of the support.

In this method, the support may be removed easily by using a solubilizer which makes the support member dissolve and not make the molding material dissolve. Further, if a material which is easy to remove although does not dissolve is used, workload may be reduced significantly.

U.S. Patent No. 2001/0042598 discloses the following method. After forming a layer of a 3D object (a model portion) by a modeling material in an apparatus, a material which becomes a support is provided to surround the layer, and patterning is performed. A support member (a support) is formed in this manner and, on the support and the layer of the 3D object under formation, a material which becomes the 3D object is laminated. According to the disclosed method, since the support portion is made of a material different from that of the model portion, removal of the support is also easily performed.

In the method disclosed in U.S. Patent No. 2001/0042598, however, it is considered that the thickness accuracy of the layers is not enough. In the lamination modeling method, sufficient accuracy is needed also for the thickness of the layers to be laminated in order to implement accurate modeling. If the 3D object to be modeled and the support are made of different materials as in the method disclosed in U.S. Patent No. 2001/0042598, the following problems may be caused. The first problem relates to the alignment between the 3D object to be modeled and the support portion. If these portions are misaligned, a gap is formed and, therefore, an overhung portion is not able to be supported. If the modeling material and the support portion overlap each other, there is a possibility that a protrusion is formed, or adhesiveness on a surface of the modeling material is reduced. As a result, strength of the 3D object may be reduced. The second problem relates to volumetric shrinkage. Forming layers of uniform thickness by different materials requires difficult control from the viewpoint of accuracy at the time of supplying the materials and volume change influenced by the environment. As described above, in the method disclosed in U.S. Patent No. 2001/0042598, there is a problem that an accurate alignment mechanism is needed and that thickness accuracy of the layer to be laminated is not enough.

SUMMARY OF THE INVENTION

The present invention provides a manufacturing method capable of obtaining a structure with high forming accuracy while easily removing a support without making the apparatus complicated. The present invention also provides a manufacturing apparatus which implements such a manufacturing method.

The present invention is a manufacturing method of a structure in which the structure is manufactured by laminating a modeling layer which becomes the structure while supporting the structure under formation with a support member, the method including, in this order: preparing the modeling layer provided on a surface of an intermediate transfer member; a unit configured to provide a layer constituted by the support member and the modeling layer by making a regulating surface of a regulating member for regulating an upper surface of the modeling layer on the opposite side of a surface which is in contact with the intermediate transfer member abut the upper surface of the modeling layer, pouring a material for the support member which becomes the support member to fill a gap between the intermediate transfer member and the regulating member in the periphery of the modeling layer while the regulating member abutting the upper surface of the modeling layer, and solidifying the material for the support member; removing the regulating member from the layer constituted by the support member and the modeling layer; aligning a surface of the layer constituted by the support member and the modeling layer exposed when the regulating member is removed with surfaces of the structure under formation and a support member which supports the structure while supporting the layer constituted by the support member and the modeling layer by the intermediate transfer member; and removing the regulating member from the layer constituted by the support member and the modeling layer.

Further features of the present invention will become apparent from the following description of exemplary embodiments with reference to the attached drawings.

BRIEF DESCRIPTION OF THE DRAWINGS

FIGS. 2A to 2E are schematic diagrams illustrating a process of modeling in a modeling apparatus according to a second embodiment of the present invention.

DESCRIPTION OF THE EMBODIMENTS

Hereinafter, an embodiment of the present invention will be described with reference to the drawings.

Embodiment

Figure 1:
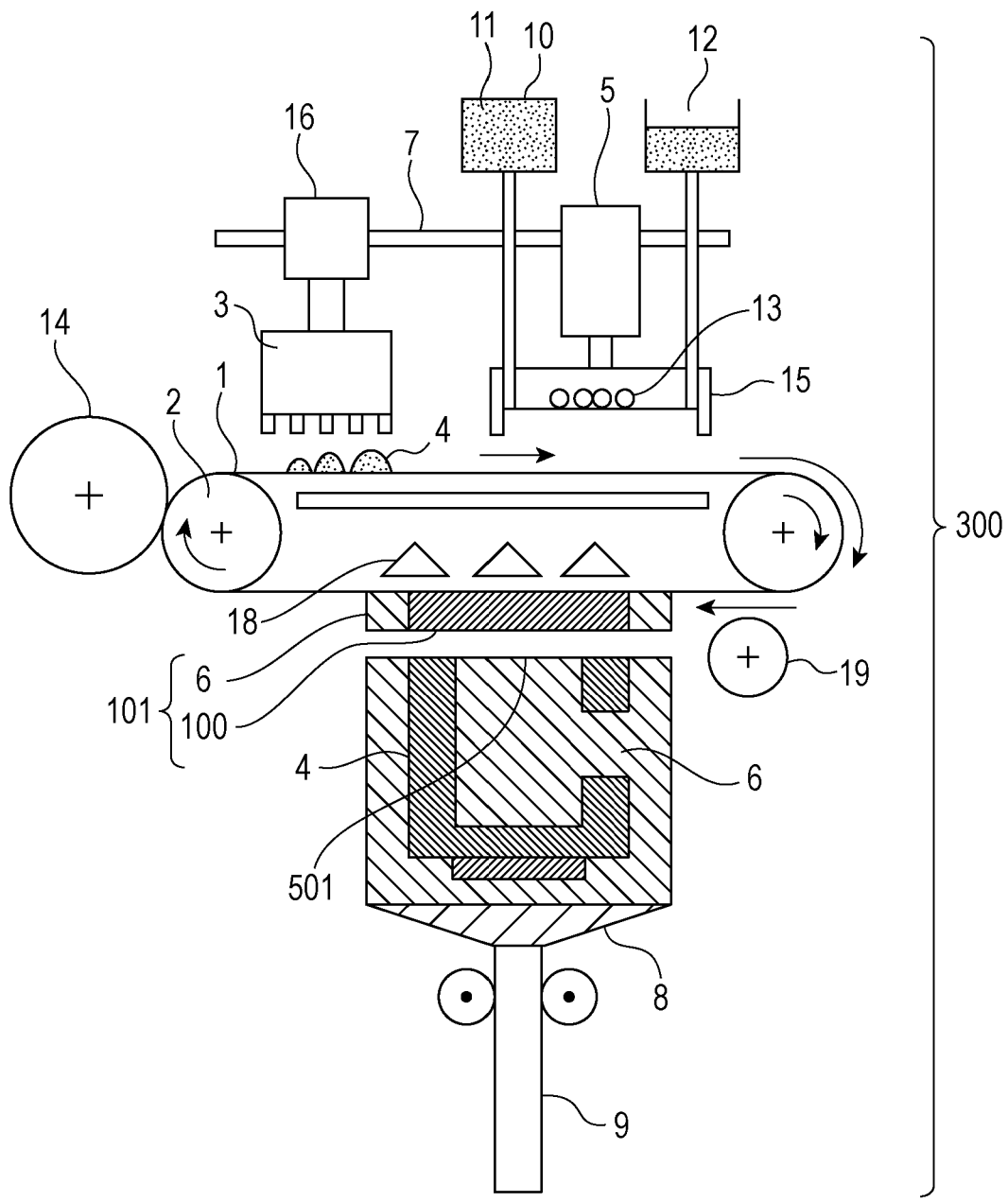
FIG. 1 is a schematic diagram illustrating an example of a modeling apparatus according to a first embodiment of the present invention.

FIG. 1 is a schematic diagram illustrating an example of a lamination modeling apparatus which is a manufacturing apparatus to implement a method for manufacturing a modeled product that is a 3D structure according to a first embodiment of the present invention. A modeling apparatus 300 includes an intermediate transfer member 1 which is conveyed by a conveying mechanism 2. A modeling layer 100 is formed on the belt-shaped intermediate transfer member 1, transferred to a modeling plate 8 by the conveying mechanism 2, and contacted on a structure 4 under formation and laminated to on the structure 4. The structure 4 is supported by a support member 6 which is a support member for supporting the structure 4 under formation and is formed of a support member material. A modeling layer 100 is laminated as a single layer together with the support member 6 surrounding the peripheral of the modeling layer 100. Formation of the modeling layer 100 and the support member will be described later. The reference numeral 7 denotes a guide which, when the modeling layer 100 is formed on the intermediate transfer member 1, aligns a liquid ejection head 3 and a regulating container 15 with a design position and ascends and descends each unit with respect to a design height by ascending/descending mechanisms 16 and 5. The liquid ejection head 3 applies a modeling material for forming a modeling layer to the intermediate transfer member 1 and forms the modeling layer in a desired pattern. The regulating container 15 functions as upper and side walls when a support material described later is poured. In this manner, distances among the liquid ejection head 3, the regulating container 15 and a transfer surface of the intermediate transfer member 1 are adjusted. The reference numeral 11 denotes a support filling mechanism which fills a support material 10 which will become the support member 6 into the regulating container 15 in a flowing state. The reference numeral 19 denotes an application mechanism. If the formed modeling layer has no adhesiveness, a thermosetting adhesive, an ultraviolet curing adhesive, or the other adhesives for lamination of the sheets is applied to the transfer surface of the modeling layer 100 by an application mechanism 19. An ascending/descending mechanism 9 for adjusting the height is provided in the modeling plate 8. An UV lamp 18 is a means for curing the adhesives applied by the application mechanism 19. The reference numeral 14 denotes is a cleaning unit which cleans a surface of the intermediate transfer member for the next use after the transfer is completed. In the illustrated example, the liquid ejection head 3 and the regulating container 15 are disposed on the opposite side with respect to the modeling plate 8 on both sides of the intermediate transfer member 1. Alternatively, the modeling plate 8 may be provided on the same side as the liquid ejection head 3 and the regulating container 15.

Next, a method for forming the modeling layer 100 will be described with reference to FIGS. 2A to 2E in addition to FIG. 1. FIGS. 2A to 2E are schematic cross-sectional views illustrating a process in the method for manufacturing the modeling layer according to the embodiment of the present invention. FIGS. 2A to 2E illustrate an area near the liquid ejection head 3 and the regulating container 15 of the apparatus illustrated in FIG. 1.

First, as illustrated in FIG. 2A, ink 4 which is the modeling material for forming the modeling layer 100 is ejected onto the intermediate transfer member 1 by the liquid ejection head 3 and an ink pattern is formed. Here, since the intermediate transfer member 1 needs to transfer the modeling layer 100 after the modeling layer 100 is formed on the surface thereof, it is desirable that the intermediate transfer member 1 is made of a material with higher releasability than that of a material which forms the modeling layer 100. It is also desirable that the intermediate transfer member 1 has elasticity to increase surface followability at the time of the transfer. The intermediate transfer member 1 is desirably made of, for example, a compound containing fluoride and silicone, and a rubber material containing oil. Specifically, the intermediate transfer member 1 is desirably made of fluorine-containing rubber or silicone rubber. A two-layer configuration consisting of fluorine film arranged on an elastomer surface may also be used. Some kinds of modeling materials to be used are likely to be repelled on the surface of the intermediate transfer member 1. In such a case, the surface of the intermediate transfer medium 1 may be processed to such an extent that releasability is not impaired. In the apparatus used in the present embodiment, the intermediate transfer member 1 formed from a transparent material is used to enable UV light transmission.

Regarding the apparatus illustrated in FIGS. 1 and 2A to 2E, a method for ejecting the ink at a desired position from the ejecting head which includes an ejection port through which the liquid is ejected is described as a exemplary means for providing the material which becomes the modeling layer on the intermediate transfer member 1. However, the means is not limited to the same. Other means may include a use of a digital recording apparatus, such as an electrophotographic device and a dispenser, or a use of a plate-system patterning technique, such as offset printing and screen printing, in which plates to be used are changed one after another. Patterns obtained by photolithography and electrolytic plating may also be used without problems. In the present invention, a pattern manufactured in the environment optimum to each means and material may be employed. That is, the means for patterning may be selected in accordance with the material and modeling accuracy of the modeled product with less strict limitations. Among the means described above, inkjet is desirable in which patterning may be performed in a non-contact manner.

In the present embodiment, UV ink is used as the ink 4. When UV light is illuminated thereon, UV ink is solidified and is converted into resin. Therefore, UV ink is desirable because it is lightweight and relatively strong. Besides UV ink, hot melt ink, heat curing ink and other kinds of ink may also be used desirably. It is also possible to combine the materials and to obtain a desired color using plural ink pattern forming means. The user may select the modeling material within a range to which a patterning apparatus may be applied and may select the patterning apparatus depending on the material to use.

Next, as illustrated in FIG. 2B, the regulating container 15 is moved above the pattern of the ink 4.

Next, as illustrated in FIG. 2C, the regulating container 15 is descended so that an appropriate design gap is provided. At this time, it is desirable that the amount of the ink 4 is adjusted not to be excessively large so that pattern distortion does not occur. Since a ceiling surface of the regulating container 15 functions as a regulating surface which regulates the upper surface of the support member, it is desirable that the amount of ink to be applied is controlled so that the ink 4 is in contact with the ceiling surface. The regulating surface of the regulating container 15 which is an upper regulating member 15a is flattened with high accuracy. An UV lamp 13 for solidifying the modeling material is provided in an upper portion of the regulating container 15. The regulating member 15a is made of a transparent material which enables efficient transmission of UV light from the UV lamp 13. In the state in which the ink 4 is in contact with the regulating member 15a and the thickness of the ink 4 is regulated by the regulating member 15a, the ink 4 is solidified when light from the UV lamp 13 is illuminated thereon, the phase of the ink 4 is converted into solid, and a shaped modeling layer 100 is obtained.

Next, as illustrated in FIG. 2D, the regulating container 15 in which the thus prepared modeling layer 100 is disposed is filled with the support material 10 which becomes the support member 6. Desirably, the support material 10 is a liquid material which solidifies in response to an external stimulus. Further, desirably, the support material 10 is a material easily removed from the modeled product. The external stimulus may include heat, light, electric power, magnetic force and vibration. Among these, heat is the stimulus with which a material easily demonstrates its reversibility. Paraffin wax is used in the present embodiment. When paraffin wax is used, for example, as the support member 6, the paraffin wax is poured in at a temperature exceeding the melting point thereof and may be solidified by cooling to a temperature below the melting point thereof. When the melting point of the support member is set to be lower than the melting point of the modeling material, the support may be easily removed by keeping a temperature of the entire support member and modeling material to be the melting point of the support member or higher and be the melting point of the modeling material or lower for a certain period of time after the modeling is completed. When the support material 10 is poured into the regulating container 15, the space without the modeling layer 100 is filled with the support material 10 and an excessive amount of the support material 10 is discharged from an overflow 12. Then, pouring is stopped. Since the support material 10 automatically flows into a space where the modeling layer 100 does not exist, there is no need for the alignment or regulation of the layer thickness. Here, the thickness of the support material 10 is regulated by the regulating member 15a and thus the upper surfaces of the modeling layer 100 and the support member 6 (here, a surface on the opposite side of the intermediate transfer member 1) are aligned. Exemplary pouring means may include a normal liquid movement means, such as pressure pouring and decompression sucking. In order to prevent defective filling, it is effective to increase flowability by providing a temperature control mechanism in a flow path and heating, to provide fine high frequency vibration using an ultrasonic vibrator and the like, or to assist the filling by decompressing and the like.

Next, when paraffin wax is solidified by natural cooling and the support member 6 is formed as illustrated in FIG. 2E, the regulating container 15 is separated and removed. On the intermediate transfer member 1, a pattern sheet 101 is formed with the thickness of the modeling layer 100 and the support material 10 having been controlled by the regulating member 15a. An upper surface of the pattern sheet 101 which is separated from the regulating surface and exposed is aligned with the surface of the regulating member 15a, and a back surface of the pattern sheet 101 is aligned with the surface of the intermediate transfer member 1. Therefore, the upper and the back surfaces of the pattern sheet 101 are smooth and have no unevenness in thickness, and occurrence of a step between the modeling layer 100 and the support member 6 may further be avoided.

The thus created pattern sheet 101 is conveyed in the direction of the arrow by the conveying mechanism 2 and the pattern sheet 101 is moved to the opposite side of the regulating container 15. Although the pattern sheet 101 and a roller 2 are illustrated in the size for ease of explanation, the pattern sheet 101 follows the curve of the roller 2 and is conveyed to the modeling plate 8 without problem.

An adhesive is applied to a transfer surface of the pattern sheet 101 by the application mechanism 19 while conveying the pattern sheet 101. Although there is no particular limitation on the kind of adhesives to be used, it is desirable to select in consideration of, for example, a shrinkage rate and adhesive strength as indices depending on the material of the modeling layer 100. In the foregoing embodiment, the adhesive is applied by a roll coater shaped application means. However, the application means is not limited to the same and an application mechanism 19 of injection system, such as a spray, may also be used. An application mechanism which may define an application portion of the adhesive depending on a surface shape of the modeling layer 100, such as inkjet, is significantly desirable. For example, if the adhesive is selectively applied to the modeling layer 100 so as not to be applied to the support member 6, after the support member 6 is removed to obtain the structure when the modeling is completed, occurrence of a phenomenon that the adhesive applied to the support member 6 remains integrally with the adhesive on the structure may be avoided and thus there is no need to remove the adhesive. Therefore, this method is desirable. When a roll coater is used, depressions and projections may be formed on a surface of the coat roll such that the adhesive may be applied in a fine isolated dot pattern. In that case, the adhesive is easily removed together with the support member 6 and thus remaining of the adhesive on the support member 6 in the structure is reduced. Also in the case of spray coating, if the amount of application is controlled so that no continuous layer is formed, the same effect may be obtained.

In the present embodiment, an aqueous UV adhesive is used as the adhesive. In a case in which a component which repels the adhesive, such as paraffin wax, is use as the support member 6, if the adhesive is applied to the entire surface of the support member 6, the adhesive does not adhere to the paraffin wax and thus the adhesive may automatically be applied only to the modeling layer 100.

As illustrated in FIG. 1, the pattern sheet 101 to which the adhesive has been applied is further conveyed and is positioned at a position of the modeling plate 8. When the modeling plate 8 is ascended and brought into contact with the pattern sheet 101, light is emitted from the UV lamp 13 disposed on the back surface side of the intermediate transfer member 1, the adhesive is solidified, and the pattern sheet 101, the structure 4 under formation and the support member 6 are made to adhere to one another.

The adhering method for the lamination is not limited to application of the adhesive. Lamination may be performed without using an adhesive. For example, the modeling layer 100 may be made of thermoplastic resin and heated at the time of lamination to cause the modeling layer to melt.

In the apparatus of FIG. 1, the intermediate transfer member 1 after the transfer is completed is taken up on the cleaning unit side and is reused, but this configuration is not restrictive.

When these processes are repeated predetermined times, the structure is modeled in a state surrounded by the support member 6. When the support material 10 is removed finally, the modeled product is completed. If the support material 10 is the paraffin wax which is an example of the support material 10 used in the apparatus of FIG. 1, the support material 10 may be automatically removed when the support material 10 is heated to the melting point of the paraffin wax or higher.

Figure 3:
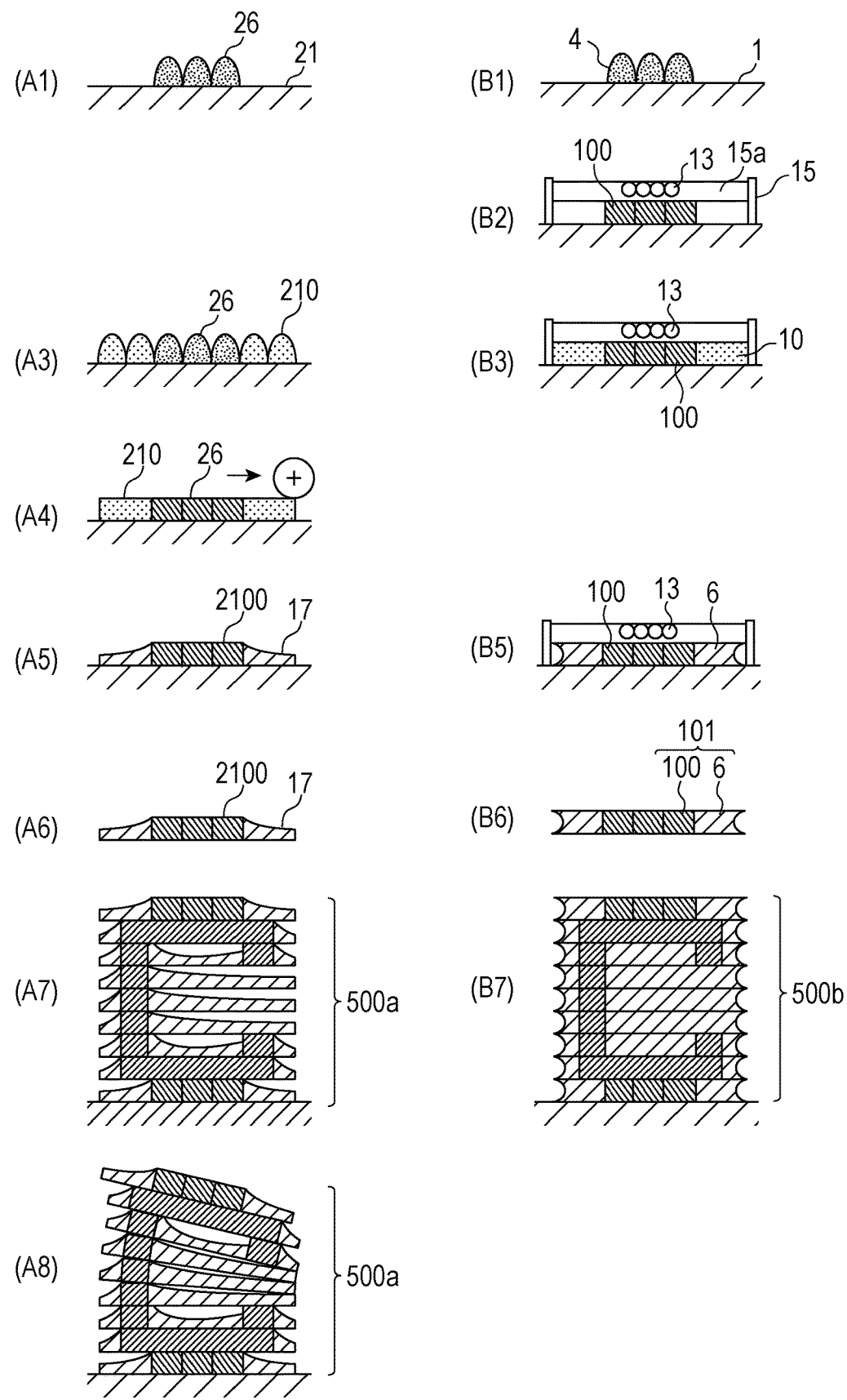
FIG. 3 illustrates cross-sectional views illustrating each step of an exemplary method for modeling a structure according to the first embodiment of the present invention and a method for modeling a structure according to a comparative embodiment.
Figure 5:
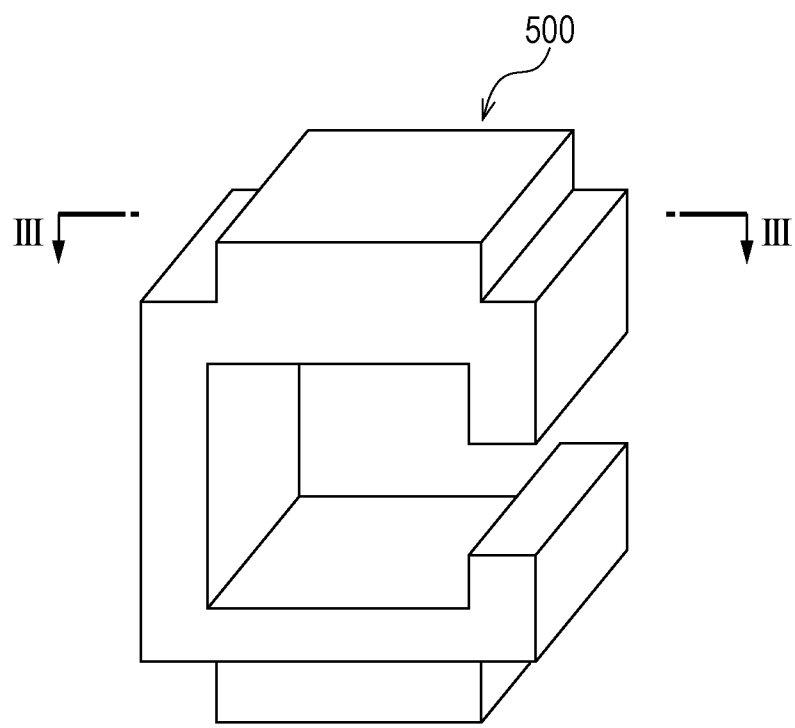
FIG. 5 is a perspective view of a structure to be modeled.

According to the embodiment of the present invention, the structure may be made with high forming accuracy. FIG. 3 is cross-sectional views illustrating distortion which is applied to the modeled product by the thickness accuracy of the pattern sheets. In FIG. 3, (A1) to (A8) are diagrams illustrating the method of a comparative embodiment and (B1) to (B7) are schematic diagrams illustrating the embodiment of the present invention. FIG. 3 illustrates a process performed to obtain the structure 500 as illustrated in FIG. 5 and, specifically, illustrates a cross section of the structure 500 when the structure 500 is cut at a plane crossing III-III of FIG. 5 and vertical to the structure 500.

[Process 1]

In a comparative embodiment, ink 26 is applied onto an intermediate transfer member 21 (A1). In the embodiment, ink 4 is applied onto the intermediate transfer member 1 (B1).

[Process 2]

In the embodiment, thickness of the modeling layer 100 is set to a designed thickness by placing the regulating member 15a on the upper surface of the modeling layer 100 in a state in which there is no support (B2). In the comparative embodiment, since flattening is performed after the support material is applied, the process 2 is skipped.

[Process 3]

In the comparative embodiment, a support material 210 is applied at positions next to the pattern of the ink 26 (A3). It is necessary to dispose an extremely appropriate amount of the support material 210 while accurately aligning with the pattern of the ink 26. In the embodiment, on the other hand, it is only necessary to fill the space with the support material 10 of the liquid state until the space is filled up without any need of alignment (B3).

[Process 4]

In the comparative embodiment, surfaces of the ink pattern 26 and the support material 210 are chipped to the design film thickness using a chipping roller to obtain flat surfaces. At this time, a mechanism to avoid debris from adhering to the formed pattern is needed.

[Process 5]

When the modeling material and the support material are solidified, a change occurs in the volume thereof. The situations are illustrated (A5, B5). Since the support material and the modeling material are made of different materials and have different volume change rates, deformation is caused. In the comparative embodiment, since an upper surface of the layer-shaped pattern is open, contraction is caused in the thickness direction and solidified. Therefore, a step is formed between a formed modeling layer 2100 and a formed support member 17 (A6). In the embodiment, on the other hand, since the upper surface of the modeling layer 100 is regulated by the regulating member 15a and contraction of the support material 10 is caused in the side direction, a change in the thickness is controlled and surface flatness is not impaired (B6).

The structures obtained by laminating the thus prepared pattern sheets are compared. In the comparative embodiment, since the thickness of the pattern sheets is uneven, there are gaps between the layers (A7). For this reason, distortion is caused in the structure as illustrated in (A8). In the embodiment, as illustrated in (B7), the thickness of the pattern sheet is uniform and it is not likely to cause it is hard to produce distortion in the structure.

Figure 4:
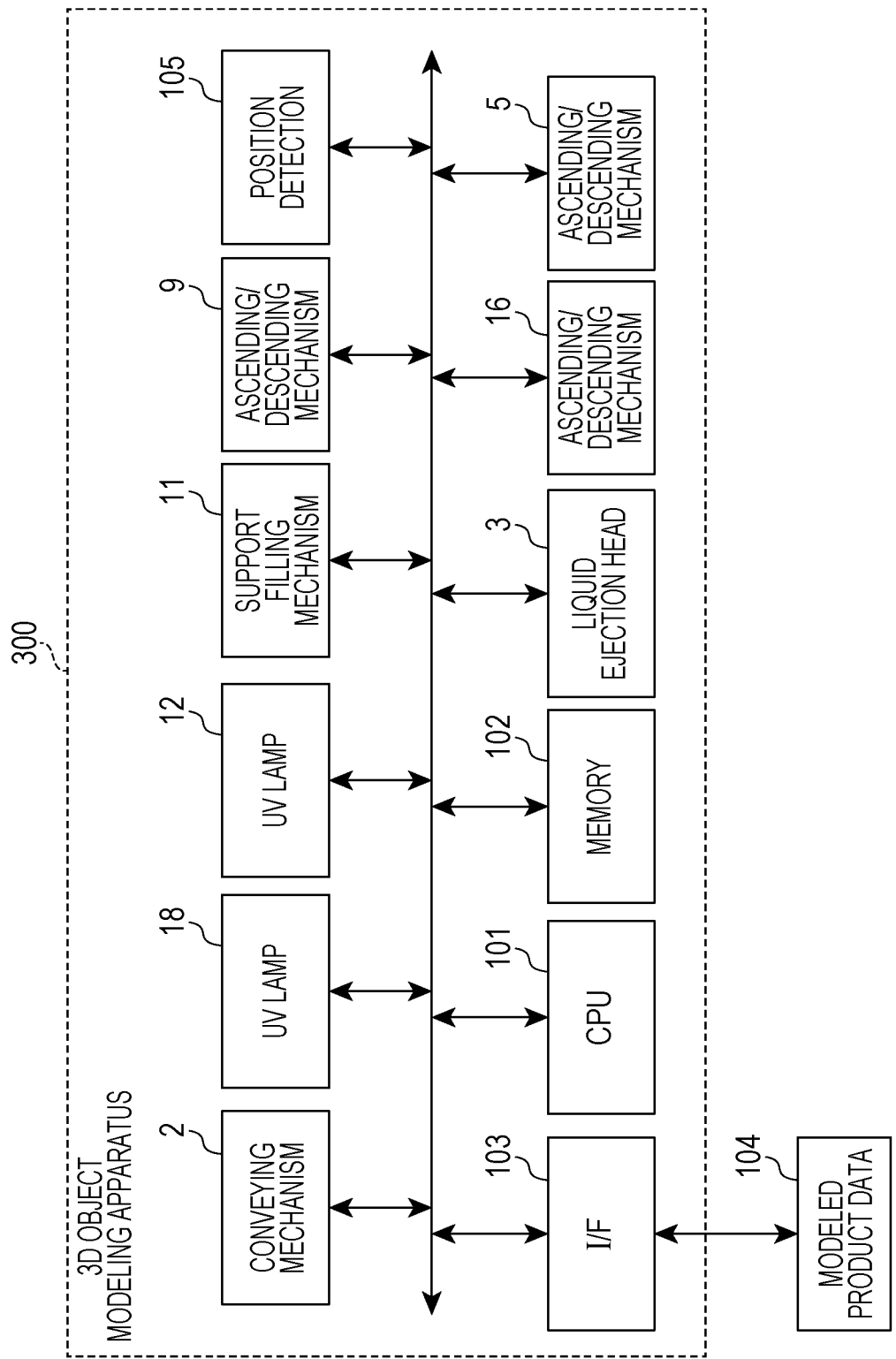
FIG. 4 is a conceptual diagram illustrating a function of a lamination modeling apparatus according to an embodiment of the present invention.

FIG. 4 is an example of a control system of the modeling apparatus of FIG. 1. In the entire modeling apparatus, which is denoted by the reference numeral 300, the reference numeral 101 denotes a CPU which is a main control unit of the entire system configured to control each part. The reference numeral 102 denotes a memory which is constituted by ROM in which a base program of the CPU 101 is stored, RAM in which modeled product data taken in from an interface 103 is saved or on which data processing is performed, and the like. When the CPU 101 receives a signal indicating the start of the modeling, a process to convert modeled product data into slice data to be output under set conditions and, at the same time, communication is made to check the status of the conveying mechanism 2, the liquid ejection head 3, the ascending/descending mechanism 5, the ascending/descending mechanism 9, the ascending/descending mechanism 16, and a support filling mechanism 11. If these components are in the status that may start modeling, the conveying mechanism 2 and the ascending/descending mechanism 16 move to predetermined positions in accordance with information about position detection 105, an ejection signal is sent to the liquid ejection head 3 and modeling is started.

Examples

Hereinafter, examples of the present invention will be described. An example in which a structure is manufactured using the modeling apparatus illustrated in FIG. 1 will be described as Example.

Data of a target structure is acquired as, for example, CAD data and converted in advance into slice data with predetermined spaces in between layers. Slice data with the spaces of 25 μm is used in this Example.

As the intermediate transfer member 1, a belt in which 100-μm thick silicone rubber (KE42TS: product of Shin-Etsu chemical Co. Ltd.) is formed on 50-μm thick PET film is used.

First, UV ink 4 (the modeling material) is applied onto the intermediate transfer member 1 in accordance with the first layer of the slice data using the liquid ejection head 3 and a pattern is formed (FIG. 2A). At this time, the volume of the ink which forms the pattern is controlled to be uniform using transparent ink in addition to the colored UV ink.

Ink Application Conditions
Size of droplet=30 pl
Application interval of droplet=600 dpi
The application amount of the ink per address=150 pl
Ink Formulation
  Pigment: 1 part
Black: Carbon Black
Cyan: Pigment Blue 15
Magenta: Pigment Red 7
Yellow: Pigment Yellow 74
White: Titanium oxide
Transparent: Silica particles
  Acryloylmorpholine (product of Kohjin Film & Chemicals Co., Ltd.): 20 parts
  Caprolactam-modified dipentaerythritol diacrylate: 15 parts (kayarad DPCA60: product of Nippon Kayaku Co., Ltd.)
  Tetraethylene glycol diacrylate: 15 parts (Viscoat #335HP: product of Osaka Organic Chemical Industry Ltd)
  PO-A: 34 parts (Viscoat #192: product of Osaka Organic Chemical Industry Ltd)
  Photoreaction initiator (product of IRGACURE907: product of BASF): 10 parts
  2,4,6-trimethylbenzoyl phenylethoxy phosphine oxide: 5 parts (Lucrin TPO-L: product of BASF)

Next, the pattern of foregoing ink 4 is conveyed and the pattern of ink 4 is moved to a position below the regulating container 15.

Next, the regulating container 15 is descended, the regulating member 15a is brought into contact with the pattern of the ink 4, the UV lamp 13 above the regulating container 15 is turned on, the pattern of the ink 4 in the regulating container 15 is solidified, and the modeling layer 100 is formed (FIG. 2C).

Next, inside of the regulating container 15 is heated to about 60 degrees C. and the regulating container 15 is filled with the support material 10 (commercially-available paraffin wax 115° F.) in a flowing state (FIG. 2D).

The regulating container 15 is cooled by cooling air to solidify the paraffin wax and then the support member 6 is formed. When the temperature returns of the regulating container 15 returns to the room temperature, the regulating container 15 is ascended to obtain the pattern sheet 101 (FIG. 2E).

The pattern sheet 101 is then conveyed and an adhesive (UV1000: product of Daikin Industries) is applied to an upper surface of the pattern sheet 101 in the shape of fine isolated points using a roll coater having a rugged structure on a surface thereof. The pattern sheet 101 to which the adhesive has been applied is conveyed to the position of the modeling plate 8. After positioning, the modeling plate 8 is ascended and the pattern sheet is laminated, via an adhesive layer, on the structure under formation. In this state, the UV lamp 18 located on the back of the intermediate transfer member 1 is turned on and the adhesive is hardened. After the adhesive is hardened, the modeling plate 8 is descended and the intermediate transfer member 1 is removed from the laminated pattern sheet. The pattern sheet is transferred to the structure on the side of the modeling plate 8.

The foregoing creation and lamination of the pattern sheet is repeated until lamination of all the pattern sheets of the cross section of the structure is completed. Then, the support member and the structure are heated to 60 degrees C., at which the support member begins to melt and the colored modeled product may be taken out. The obtained structure is formed with desired accuracy and defects, such as peeling between layers, are not observed.

In the foregoing embodiment, a space of the same height as that of the modeling material pattern is formed by placing the regulating member on the upper surface of the pattern of the modeling material and the space is filled with the support material. In this manner, high thickness accuracy of the pattern sheet to be formed is provided. Further, by filling the space divided by the regulating member with the support member in a flowing state, it is possible to create a pattern sheet with high accuracy with reduced gaps or overlapped portions without performing alignment. In addition, since the upper surface of the modeling layer is protected by the regulating surface of the regulating member, contamination due to ingression, adhesion and the like of the support material may be avoided so that the upper surface of the modeling layer may be kept clean. Therefore, adhesiveness to the layer that is next to be overlapped becomes desirable. In addition, since the phase of the used support material is changed between solid and liquid, removal of the support becomes easy. The reversible support material is recyclable. In this manner, it is possible to obtain the structure formed with high form accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A manufacturing apparatus of a structure in which the structure is manufactured by laminating a modeling layer which becomes the structure while supporting the structure under formation with a support member, the apparatus comprising:
  a transfer member;
  a liquid ejection head, having an ejection port through which a liquid is ejected, which ejects the liquid forming the modeling layer on a surface of the transfer member;
  a support filling mechanism configured to load the support member at the periphery of the formed modeling layer on the surface of the transfer member;
  a regulating member having a regulating surface;
  a first ascending-descending mechanism is connected with the regulating surface and configured to ascend and descend the regulating surface relative to the transfer member;
  a controller programmed to control the first ascending-descending mechanism to descend the regulating surface so as to dispose the regulating surface on the prepared modeling layer on the transfer member to bring the regulating surface into contact with the upper surface of the modeling layer which is at the opposite side of the transfer member,
  wherein the controller controls the support filling mechanism to load a fluid material for forming the support member, which is different from a material of the modeling layer, into a gap between the transfer member and the regulating member in the periphery of the modeling layer and solidifies the fluid material to form the support member with the regulating surface abutting the upper surface of the modeling layer, and wherein the controller controls the first ascending-descending mechanism to perform the relative movement so as to remove the regulating member from a layer formed of the modeling layer and the formed support member;

a modeling plate on which the structure under formation is held; and a second ascending-descending mechanism connected to the modeling plate and configured to ascend and descend the modeling plate relative to the transferring member, wherein the controller controls the second ascending-descending mechanism to ascend the modeling plate such that an upper surface of the layer and the structure under formation contact with each other, and such that the second ascending-descending mechanism transfers the layer formed of the modeling layer and the support member to the structure under formation.

2. The manufacturing apparatus of a structure according to claim 1, wherein first ascending-descending mechanism moves the regulating member up and down.

3. The manufacturing apparatus of a structure according to claim 1, wherein the liquid ejection head ejects a modeling material which becomes the modeling layer.

4. The manufacturing apparatus of a structure according to claim 1, wherein a modeling material for forming the modeling layer solidifies by being illuminated with UV light, and the modeling layer is formed by illuminating the modeling material with UV light in a state in which the regulating surface and the modeling material at the opposite side of the transfer member abut each other.

5. The manufacturing apparatus of a structure according to claim 4, wherein the regulating member includes an illuminating unit configured to emit UV light and illuminates the modeling material with UV light through the regulating surface of the regulating member.

6. The manufacturing apparatus of a structure according to claim 1, wherein the fluid material for the support member is paraffin wax.

7. The manufacturing apparatus of a structure according to claim 1, wherein the support filling mechanism injects the fluid material for forming the support member into the gap.

8. The manufacturing apparatus of a structure according to claim 7, wherein the support filling mechanism forms the support member by cooling the injected material.

9. The manufacturing apparatus of a structure according to claim 1, wherein the support filling mechanism loads the fluid material for forming the support member so that the fluid material contacts a side surface of the modeling layer.

* * * * *